United States Patent
Durand et al.

(10) Patent No.: US 6,811,077 B2
(45) Date of Patent: Nov. 2, 2004

(54) METHOD FOR MAKING SECURE ACCESS TO A RESIDENT APPLICATION ON A USER CARD CO-OPERATING WITH COMMUNICATION SYSTEM TERMINAL, AND CORRESPONDING TERMINAL

(75) Inventors: Romain Durand, Paris (FR); Hubert Helaine, Berkshire (GB)

(73) Assignee: Alcatel, Paris (FR)

( * ) Notice: Subject to any disclaimer, the term of this patent is extended or adjusted under 35 U.S.C. 154(b) by 135 days.

(21) Appl. No.: 10/332,710
(22) PCT Filed: Jul. 30, 2001
(86) PCT No.: PCT/FR01/02489
§ 371 (c)(1), (2), (4) Date: Jan. 13, 2003
(87) PCT Pub. No.: WO02/10918
PCT Pub. Date: Feb. 7, 2002

(65) Prior Publication Data
US 2004/0010648 A1 Jan. 15, 2004

(30) Foreign Application Priority Data
Jul. 31, 2000 (FR) ............................................. 00 10088

(51) Int. Cl.[7] .............................................. G06F 17/60
(52) U.S. Cl. ............................ 235/379; 375/380; 902/4
(58) Field of Search ............................... 235/375, 379, 235/380, 382; 902/1, 4

(56) References Cited

U.S. PATENT DOCUMENTS

| 6,092,133 | A | | 7/2000 | Erola et al. |
| 6,179,205 | B1 | * | 1/2001 | Sloan ......................... 235/382 |
| 6,273,335 | B1 | * | 8/2001 | Sloan ......................... 235/382 |
| 6,481,632 | B2 | * | 11/2002 | Wentker et al. ............. 235/492 |

FOREIGN PATENT DOCUMENTS

WO    WO 9852159    11/1998

* cited by examiner

Primary Examiner—Daniel A. Hess
(74) Attorney, Agent, or Firm—Sughrue Mion, PLLC

(57) ABSTRACT

A method of securing access by an external application to at least one user card having a microprocessor, said user card being capable of containing a plurality of internal applications, said external application corresponding to one of the internal applications, said user card co-operating with a terminal, said external application using a protocol for connection to said user card in which each type of external application is associated with a predetermined identity parameter, the method comprising the following steps:

when a first external application is connected with the corresponding internal application on the user card, the identity parameter of the application is determined;

if a second external application requests connection to said user card, the identity parameter of said second application is analyzed; and if said parameter is identical to that of the first-connected application, then access to said corresponding internal application on the user card is denied to said second external application.

6 Claims, 2 Drawing Sheets

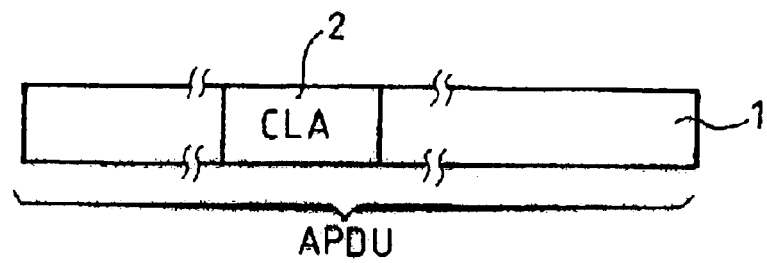
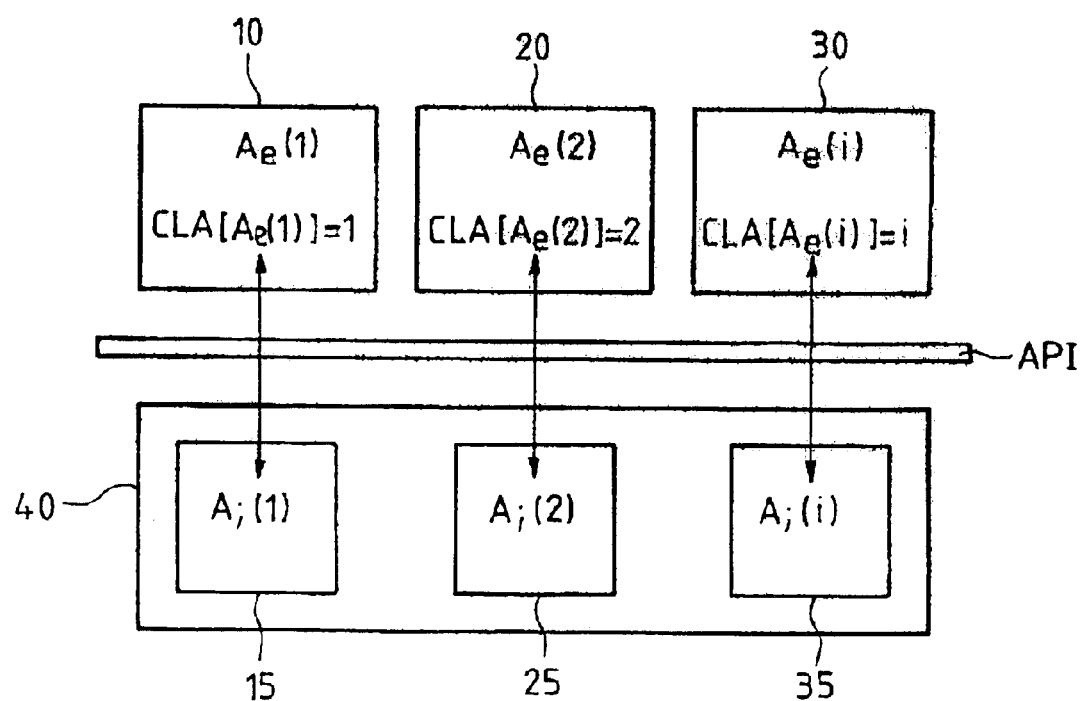

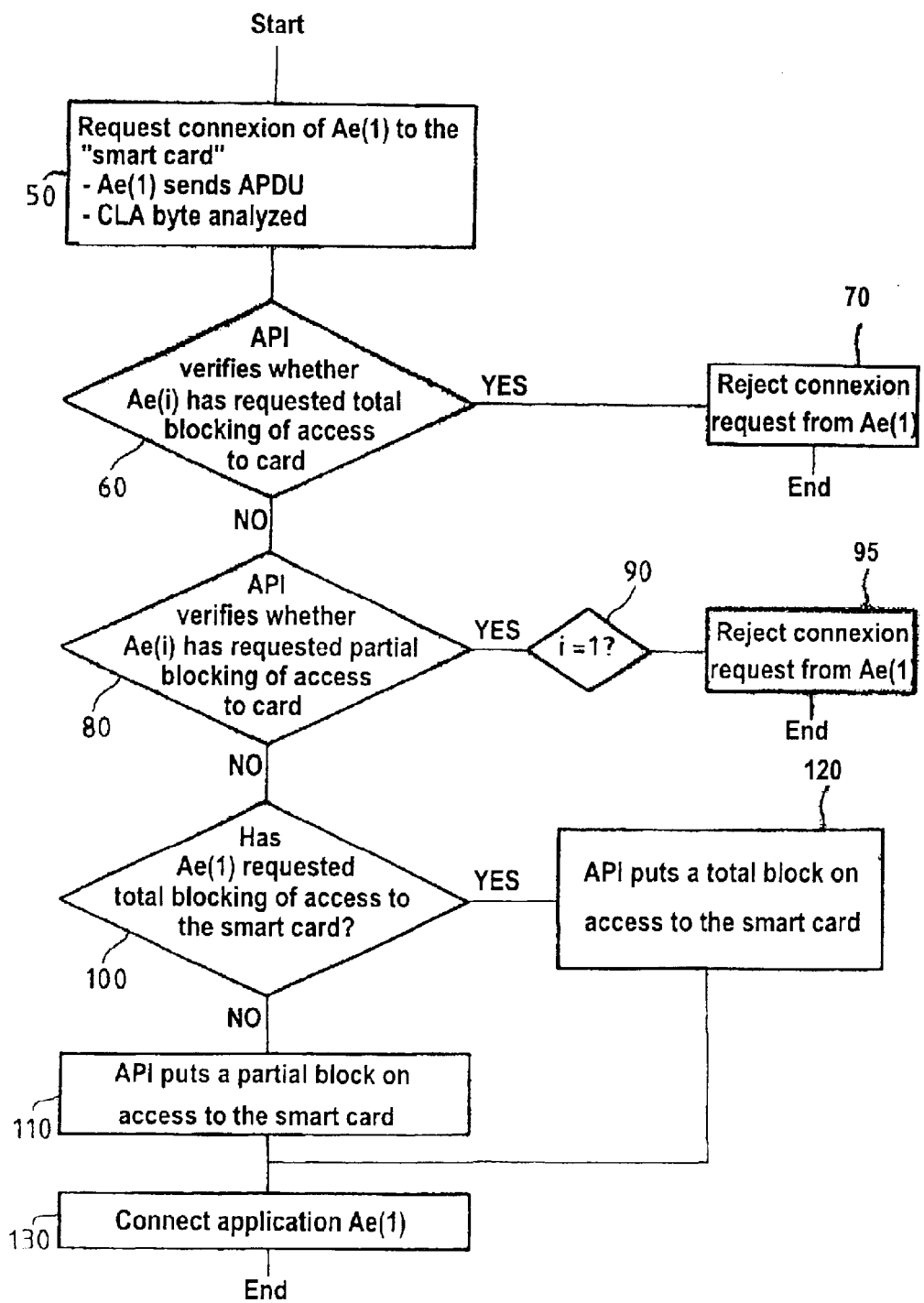

METHOD FOR MAKING SECURE ACCESS TO A RESIDENT APPLICATION ON A USER CARD CO-OPERATING WITH COMMUNICATION SYSTEM TERMINAL, AND CORRESPONDING TERMINAL

This application claims the benefit of French application no. 00/10088 filed Jul. 31, 2000.

FIELD OF THE INVENTION

The present invention relates to a method of securing access to at least one application supported by a user card having a microprocessor. The user card co-operates with one of the communications terminals in a communications system. The invention also relates to a communications terminal implementing the method.

A non-exclusive field of application of the invention is that of mobile terminals for radio communication operating in a cellular radio communication system. The invention applies particularly but not exclusively to a system implementing the global system for mobile communication (GSM).

BACKGROUND OF THE INVENTION

The terminals of a radio communication system can co-operate with at least one smart card. Each smart card contains at least one internal application. Each internal application is suitable for co-operating with an application external to the smart card. For example, the external application can be a bank application co-operating with a user card of the payment card type supporting the corresponding bank application.

In addition, when an external application seeks to access the corresponding internal application supported by the smart card, said external application starts the connection protocol. It exchanges so-called applicative protocol data unit (APDU) data via the application programming interface (API) of the terminal. In the APDU, the external application specifies its class or type (bank, etc.). This class is given in one of the bytes of the APDU which is referred to as the "CLA" byte.

The concept of having a plurality of applications united on a common card is highly advantageous for the subscriber. This enables the subscriber to use the terminal to perform numerous operations such as paying for an order likewise made from the terminal, and to do so simply and solely by means of the terminal.

Thus, various different external applications can have access simultaneously to corresponding internal applications on a single smart card. However, two identical external applications must not have access simultaneously to the corresponding internal application on the smart card.

It must be possible to restrict access in this way in order to mitigate the risks of fraudulent use of smart card applications. During a transaction between an external bank application and the bank application on a subscriber's smart card, it is necessary to avoid any transaction with a pirate application of the bank type requesting access to the subscriber's smart card.

Furthermore, within a smart card containing a plurality of different internal applications, it is difficult to guarantee that there will be no leakage between the various internal applications. Thus, consider the case of a first external application X already in communication with the corresponding internal application X situated on the smart card. If a pirate external application X' seeks to communicate with the internal application X, then the application X' might be able to connect with an internal application Y situated in the smart card close to the internal application X. Thereafter, the application X' might be able to take advantage of any possible leakage between the internal applications in order to reach the internal application X.

In the state of the art, there exists an on/off model. That model operates, for example, on pieces of equipment such as Internet communication terminals that give access to the Internet. With this type of terminal, applications can be downloaded from the outside.

If the connection protocol used by the external application is known by the terminal, then the external application is said to be an "authorized" application and it can access the corresponding internal application of the smart card. However, if another authorized external application of the same class as the first requests access to the same internal application of the smart card, the second application can also gain access to the same internal application of the smart card, thereby establishing an interface between the two external applications.

The prior solution is therefore not sufficient for mitigating the above-mentioned risk.

SUMMARY OF THE INVENTION

The invention solves this problem by enabling an external application to reserve access to the corresponding internal application of the user card to itself alone.

More precisely, the invention provides a method of securing access of an external application to at least one user card having a microprocessor.

Said user card is capable of containing a plurality of internal applications, with said external application corresponding to one of the internal applications.

Said user card co-operates with a terminal.

Said external application uses a protocol for connection to said user card in which each type of external application is associated with a predetermined identify parameter. The method comprises the following steps:

when a first external application is connected with the corresponding internal application on the user card, the identity parameter of the application is determined;

if a second external application requests connection to said user card, the identity parameter of said second application is analyzed; and if said identity parameter is identical to that of the first-connected application, then access to said corresponding internal application on the user card is denied to said second external application.

In particular, the method comprises a connection protocol between the external application and the corresponding internal application on the user card. This protocol results in an APDU exchange, containing a plurality of bytes, between the external application and the internal application situated on the user card via the software interface of the terminal, said identity parameter being represented by at least one of the bytes of the APDU.

The method comprises a connection protocol during which an APDU exchange takes place such that at least one of the bytes of the APDU is the CLA byte defining the class of the external application, each identical external application type that might be capable of exchanging APDUs having an identical CLA byte, said identity parameter being the CLA byte.

The method is such that once the external application of a defined class has fully reserved access to at least one user card, said identity parameter is analyzed by the software interface for all possible classes which define an external application.

Other characteristics and advantages of the invention appear on reading the following description relating to an embodiment given by way of non-limiting example. The description refers to the accompanying drawings.

BRIEF DESCRIPTION OF THE DRAWINGS

FIG. 1 is a block diagram of an APDU type data unit.

FIG. 2 is a simplified block diagram of the device of the invention implementing the method of the invention for securing access.

FIG. 3 is a flow chart of the method of the invention for securing access.

DESCRIPTION OF THE PREFERRED EMBODIMENTS

With reference to FIG. 1, when an external application seeks to gain access to the corresponding internal application supported by the smart card situated in a terminal of a radio communications system, said application initiates the connection protocol and exchanges so-called APDU data 1 with the terminal. This APDU data comprises a plurality of bytes. One of these bytes is the CLA byte 2. This byte specifies the class of the external application. Two external applications that are of the same type, for example two applications of the bank type, both have the same class.

With reference to FIG. 2, each terminal in a radio communication system co-operates with at least one smart card 40. Each smart card 40 can contain a plurality of internal applications 15, 25, 35 corresponding to external applications 10, 20, 30.

Each external application Ae(i) of a given type possesses a given class such that CLA[Ae(i)]=i.

Two external applications Ae(1) and Ae(2), 10 and 20 are of different types, and thus have different classes, and therefore have respective CLA bytes of different values CLA[Ae(1)]=1 and CLA[Ae(2)]=2.

This external application can be local, such as the GSM application of a GSM terminal. Alternatively it may be remote such as a bank application communicating with the bank application of the smart card.

Below, the term "total blocking" is used to mean total blocking of access to the API and thus to the smart card has been requested by an external application, thereby preventing access to the smart card by any other external application regardless of its class.

Similarly, the term "partial blocking" is used to mean that partial blocking of access to the API and thus to the smart card has been requested by a first external application so as to prevent access to the smart card by a second external application having the same class as the first.

In FIG. 3, in step 50, an external application Ae(1) requests access to the internal application Ai(1) contained in a smart card of a terminal in a radio communication system. The external application sends APDU type data using the connection protocol via the software interface of the terminal (API). This external application is associated with a predetermined identity parameter: the CLA byte contained in its APDU is such that CLA[Ae(1)]=1. The value of the CLA byte is analyzed.

Thereafter, in step 60, the API verifies whether access to the smart card is already blocked by another external application Ae(i) that has requested that access to the smart card be blocked for all other applications regardless of class (which constitutes total blocking):

If that it the case, then the method moves onto step 70 and the request is rejected.

If that is not the case, then the method moves onto step 80.

In step 80, the API verifies whether access to the smart card is being blocked by another external application Ae(i) which has requested partial blocking for all applications in the same class, i.e. having a CLA byte with the same value CLA[Ae(1)]=i:

If this is the case, then the method moves onto step 90 where the API verifies whether i=1:

If i=1 (i.e. both applications are in the same class), then the connection request from Ae(1) is rejected;

If i<>1 (the two applications are of different classes), then the method moves onto step 110;

If this is not the case, then the method moves onto step 100.

In step 100, the external application must make a request to the API if it desires total blocking prior to moving onto step 130:

If this is not the case, then access to the smart card is blocked in step 110 for any external application having the same class as the application Ae(1), i.e. having a CLA byte equal to 1 (partial blocking of the API).

If this is the case, then access to the smart card is blocked in step 120 for all external applications regardless of class (total blocking of the API).

In step 130, the application Ae(1) gains access to the corresponding internal application Ai(1) of the smart card.

What is claimed is:

1. A method of securing access by an external application to at least one user card having a microprocessor, said user card being capable of containing a plurality of internal applications, said external application corresponding to one of the internal applications, said user card co-operating with a terminal, said external application using a protocol for connection to said user card in which each type of external application is associated with a predetermined identity parameter, the method being characterized in that:

when a first external application is connected with the corresponding internal application on the user card, the identity parameter of the application is determined;

if a second external application requests connection to said user card, the identity parameter of said second application is analyzed; and if said parameter is identical to that of the first-connected application, then access to said corresponding internal application on the user card is denied to said second external application.

2. A method according to claim 1, in which: the protocol for connection between the external application and the corresponding internal application on the user card results in an APDU exchange containing a plurality of bytes between the external application and the internal application situated on the user card via the software interface of the terminal, said identity parameter being represented by at least one of the bytes of the APDU.

3. A method according to claim 2, in which: at least one of the bytes of the APDU is the CLA byte defining the class of the external application, each identical external application capable of exchanging APDUs having an identical CLA byte, and said identity parameter being the CLA byte.

4. A method according to claim 2, characterized in that once the external application of a defined class has implemented total blocking of access to at least one user card, analysis of said identity parameter by the software interface is performed on all possible classes that define an external application.

5. A method according to claim 1, operating in a communications system enabling cellular radio communication to be performed, in which said communication terminals are radio communication terminals and said user cards are smart cards.

6. A radio communication terminal co-operating with at least one user card having a microprocessor for implementing the method according to any preceding claim, the terminal being characterized in that it includes means for executing distinct commands, distinct data storage means for each application of a distinct class, and means for analyzing at least one identity parameter contained in the data exchanged during the connection protocol.

* * * * *